United States Patent [19]
Perkins

[11] Patent Number: 5,226,749
[45] Date of Patent: Jul. 13, 1993

[54] WASTE DISPOSAL IN HYDRAULICALLY FRACTURED EARTH FORMATIONS

[75] Inventor: Thomas K. Perkins, Dallas, Tex.

[73] Assignee: Atlantic Richfield Company, Los Angeles, Calif.

[21] Appl. No.: 910,381

[22] Filed: Jul. 8, 1992

[51] Int. Cl.$^5$ .............................. B09B 3/00; B65G 5/00
[52] U.S. Cl. ..................................... 405/128; 166/308; 175/66; 405/266
[58] Field of Search ................ 405/128, 59, 129, 266; 166/308, 305 D; 175/66, 206

[56] References Cited

U.S. PATENT DOCUMENTS

| | | | |
|---|---|---|---|
| 3,606,925 | 9/1971 | Poettmann | 166/305 D |
| 4,848,468 | 7/1989 | Hazlett et al. | 166/308 X |
| 4,850,431 | 7/1989 | Austin et al. | 166/308 |
| 4,942,929 | 7/1990 | Malachosky et al. | 405/128 |
| 5,085,277 | 2/1992 | Hopper | 405/128 X |
| 5,108,226 | 4/1992 | Jennings | 405/128 |
| 5,109,933 | 5/1992 | Jackson | 405/128 X |

Primary Examiner—Dennis L. Taylor
Attorney, Agent, or Firm—Michael E. Martin

[57] ABSTRACT

Slurried solid waste materials are injected into subterranean earth formations in a zone of interest which has a relatively low in situ compressive stress bounded by zones of higher in situ compressive stress and wherein the zone of interest has alternate layers of material of relatively high and low permeability to fluid flow, respectively. The solid waste slurry is conducted through an injection well penetrating the zone of interest to form a conventional two-winged hydraulic fracture. The fracture is extended by reducing the tendency to form filtercake in the fracture adjacent to the layers of material of relatively low permeability while depositing particle filtercake adjacent the earth layers of high permeability so as to provide clear fluid flowpaths through the fracture while allowing the filtercake layers disposed in the fracture to assist in propping the fracture open until adequate lateral extension of the fracture and disposal of the waste material is accomplished.

13 Claims, 2 Drawing Sheets

WASTE DISPOSAL IN HYDRAULICALLY FRACTURED EARTH FORMATIONS

BACKGROUND OF THE INVENTION

1. Field of the Invention

The present invention pertains to a method for disposing of solid wastes by forming a slurry which is injected into a hydraulically fractured earth formation in a zone which includes alternate formation layers of relatively low permeability and relatively high permeability.

2. Background

Certain types of solid waste material may be permanently disposed of by reducing the particle size of the solid material, forming a slurry with a carrier liquid and injecting the material into a subterranean earth formation. U.S. Pat. No. 5,109,933 issued May 5, 1992 to James E. Jackson and assigned to the assignee of the present invention describes a system and method for disposing of the cuttings formed during the drilling of an oil well and the like. Other types of solid waste which may be ground into relatively fine particle sizes and slurried with a carrier liquid, such as water, may also be disposed of in the manner generally in accordance with the '933 patent. However, the amount of slurried waste which may be injected into a subterranean earth formation is dependent upon several factors including the compressive stress in the earth at the zone of injection, the permeability of the earth formation and the composition of the slurry. In this regard certain problems arise which are solved by the method of the present invention.

Hydraulic fracturing of earth formations to stimulate production of hydrocarbon fluids from subterranean formations has been carried out in many parts of the world over the past 40 years or more. In hydraulic fracturing to stimulate the production of fluids, the injection fluid which forms the hydraulic fracture is commonly provided with a fluid loss control agent to minimize the leakage of fluid into the formation from the opposed faces of the fracture so that the fracture extension pressure may be maintained to obtain the desired fracture length and height. Conversely, in disposing of fluidized waste material into an earth formation, leak-off of the carrier fluid is desired so that a greater quantity of slurry may be injected into a disposal zone. However, if the permeability of the formation zone in which the fracture is being formed is relatively high, a layer of solids particles or so-called "filtercake" will rapidly accumulate on the faces of the fracture which will reduce the flowpath for the disposal slurry and result in increased pumping pressure. Control over pumping pressure must be maintained to prevent vertical or other uncontrolled growth of the fracture which may break into a zone in the earth formation which will provide an undesired flowpath for the waste material such as into a water supply area or other fluid-producing area of the formation.

Accordingly, it has been discovered that certain formation characteristics of a disposal zone for injecting solid wastes should be present so that the capacity of a particular disposal well to hold the disposed wastes in the desired zone is not unduly limited by the interference to fluid flow. The present invention overcomes certain of these problems by providing a method for disposing of solid wastes in a subterranean formation which will accommodate an increased volume of waste material from a particular disposal well without the risk of extending the fracture out of the disposal zone of interest. Accordingly, the invention results in reduced costs for disposing of solid wastes in subterranean earth formations and minimizes the risk of uncontrolled flow of the waste material into zones other than a desired waste disposal zone.

SUMMARY OF THE INVENTION

The present invention provides an improved method of disposing of solid wastes in the form of relatively small solid particles slurried with a carrier liquid and injected into an earth formation through hydraulically fractured zones of interest in the formation.

In accordance with one important aspect of the present invention, solid wastes are disposed of into an earth formation by forming a slurry of the waste and injecting the slurry through a disposal well to hydraulically fracture the formation in a zone of interest which is preferably bounded by spaced apart zones which are under compressive stresses which are higher than the stress in the zone which will permit formation and extension of a fracture. The formation zone of interest preferably includes layers of earth material which are of both relatively low and relatively high permeability. In this way extended flowpaths may be formed in the fracture while the fracture is held open by the deposition of solids resulting from leak-off of fluid through the higher permeability layers. Moreover, the fracture may be more easily extended to accommodate larger volumes of waste material.

In accordance with another important aspect of the present invention, there is provided a method for disposing of solid wastes in a hydraulically fractured zone of an earth formation wherein the injected slurry is able to move longer distances from an injection well before excessive injection pressures are required which would cause the fracture to extend out of the disposal zone of interest. By predetermining the formation zone of interest to have alternating layers of relatively high and low permeability, respectively, the slurry will lose its liquid component by filtration through the high permeability layers to leave a deposit of the solids particles as a filter cake which assists in propping open the fracture and maintaining one or more slurry flow paths in the fracture extending along the low permeability layers which will carry injected slurry greater distances from the injection well than previously obtainable.

Those skilled in the art will further appreciate the above-described features and advantages of the present invention together with other superior aspects thereof upon reading the detailed description which follows in conjunction with the drawing.

DESCRIPTION OF PREFERRED EMBODIMENTS

Figure 1:
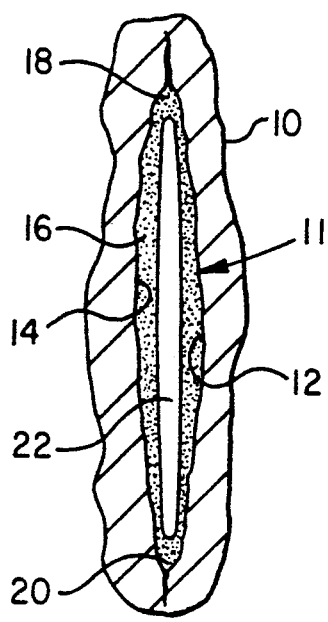
FIG. 1 is a transverse section view, in somewhat schematic form, of a hydraulic fracture in an earth formation showing the deposition of solids on the fracture faces.

In the description which follows, like elements are marked with the same reference numerals throughout the specification and drawing. The drawing figures are schematic or idealized representations of certain elements to better illustrate the invention.

In the art of hydraulically fracturing earth formations from subterranean wells, it is widely accepted that the compressive stresses in the earth at the region of fluid injection into the formation will typically result in the formation of a vertical, two "winged" fracture extending laterally from the wellbore in opposite directions and in a plane generally normal to the minimum in situ horizontal compressive stress. This type of fracture is widely recognized in the petroleum industry as that which occurs when pressure fluid, usually a mixture of water and a gelling agent together with certain proppant materials, is injected into the formation from a wellbore which is either cased or uncased. Such fractures extend laterally as well as vertically until the fracture encounters a zone or layer of earth material which is at a compressive stress greater than the fluid injection pressure at the perimeter of the fracture.

Although vertical fractures are common and are widely accepted as being the typical type of fracture progression, fractures may, in certain formations, extend at angles to the vertical as well as even in generally horizontal planes. Such fractures will also extend generally radially away from the wellbore until the fluid leakoff rate in the fracture is such that the fluid pressure at the extremity of the fracture cannot exceed the formation breakdown pressure.

Although the present invention contemplates the formation of fractures which extend generally laterally away from a vertical or near vertical well penetrating an earth formation and in a generally vertical plane in opposite directions from the well, i.e., a vertical, two-winged fracture, those skilled in the art will recognize that the invention may be carried out in earth formations wherein the fractures as well as the wellbores extend in directions other than vertical. So-called vertical fractures are shown in the drawing figures for purposes of illustration only.

As previously mentioned, in fracturing a formation to produce fluids back through the fracture and into the contiguous wellbore, the fracture process attempts to minimize the leakoff of fracture fluid through the fracture faces and into the formation. In this way fracture pumping pressure may be sustained at a high enough level to extend the fracture as far as desired to increase the productivity of the formation. To accomplish this, certain fluid loss control additives are mixed with the fracturing fluid to form a thin relatively impermeable layer on the faces of the fracture. Conversely, in disposing of slurried solid waste materials by hydraulic fracturing of zones of interest in an earth formation, if the zone of interest is of relatively uniform permeability, a fracture will form which extends in a plane generally vertically in the formation zone of interest such as that indicated in FIG. 1.

Figure 3:
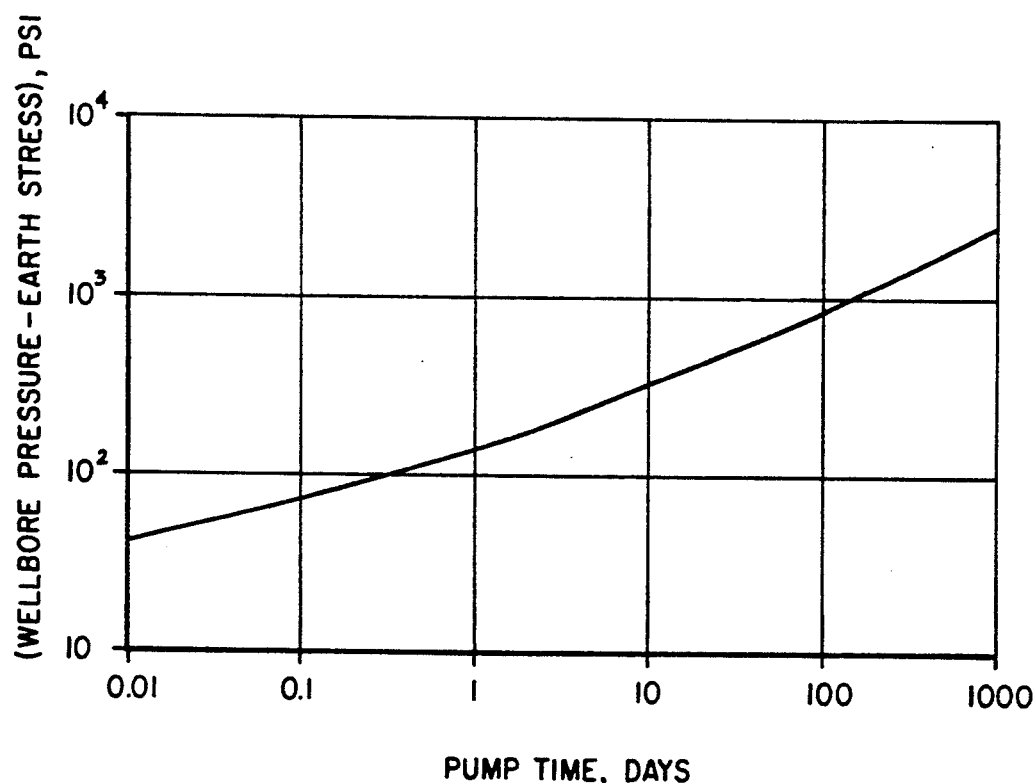
FIG. 3 is a diagram showing the increase in fluid injection pressure as a function of time for a typical waste disposal well.

In FIG. 1 a zone of interest of an earth formation 10 is shown together with a generally vertically extending fracture 11 with opposed faces 12 and 14. The fracture 11 is indicated to be extending generally vertically and, of course, also extends laterally away from a wellbore, not shown in FIG. 1. Fracture fluid laden with fine solids particles and prepared for injection in accordance with the description in U.S. Pat. No. 5,109,933, for example, will, if the permeability of the formation 10 is suitable, leak off into the formation through the faces 12 and 14 at a substantial rate leaving a layer of solids particles 16, sometimes referred to as "filtercake", on both faces and also occupying the upper and lower ends 18 and 20 of the fracture 11. This deposition of filtercake 16 formed of the solids carried by the slurry fluid will reduce the cross-sectional area of the flow passage 22. Moreover, as fluid is continually pumped through the passage 22, some of the fluid will leak off through the layer of filtercake 16 thereby tending to cause the thickness of the layer 16 to increase and the cross-sectional area of the passage 22 to be reduced even further. This will result in increased pumping pressure to attempt to widen the fracture and may, if not controlled, result in the fracture extending vertically through a bounding layer of the zone of interest and into a region which may be difficult to control fracture propagation and cause leakage of material into an unwanted area. Accordingly, the capacity of a disposal well to hold the solids waste in the desired disposal zone is limited by the interference to fluid flow caused by the build-up of the filtercake layer 16. FIG. 3 illustrates the increase in pressure at the point of injection of the fluid into a formation from a wellbore as a function of pumping time, in days, for a fracture having a nominal vertical height of about 110 feet and wherein fluid is being pumped into the fracture at a rate of about 1.33 BPM (42-gallon barrels per minute). The logarithmic scale of FIG. 3 indicates that pressure will begin to rise relatively rapidly in a short period of time with a conventional waste disposal well where the formation zone of interest delimiting the fracture has relatively uniform permeability through the opposed fracture faces and lateral end portions as described in conjunction with FIG. 1. Moreover, the increase in injection pressure may cause the fracture to break out into a zone other than that which is desired for disposal of the waste material.

Figure 2:
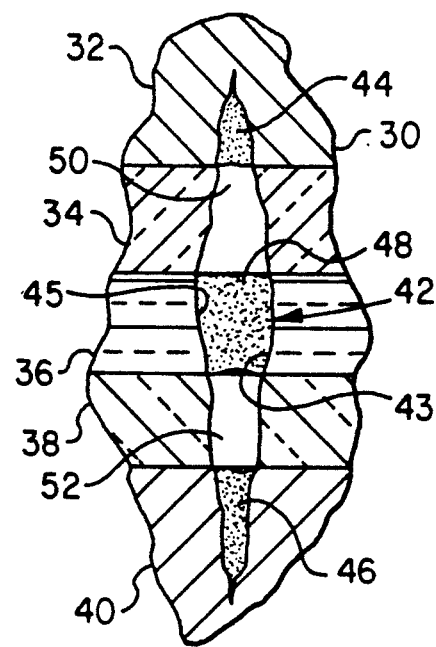
FIG. 2 is a view similar to FIG. 1 showing a hydraulic fracture through a formation having alternate layers of high permeability and low permeability and the resultant deposition of solids in the fracture adjacent the layers of high permeability.

In accordance with the present invention, however, slurried solid wastes are injected into hydraulic fractures in earth formations in predetermined zones of interest which have alternate layers of material which are of relatively low permeability and relatively high permeability, respectively. Such a zone of interest is also preferably disposed such that the earth compressive stress in the zone of interest is bounded by layers of earth formation which have higher compressive stresses so that the vertical or transverse growth of the fracture is controllable. FIG. 2 illustrates one example of a desired fracture in accordance with the present invention. In FIG. 2 an earth formation zone 30 is shown which has been delineated by conventional methods to analyze the compressive stresses and to determine the permeability of layers of material within the generally vertical extent of the zone. In FIG. 2 it is indicated that there are several "layers" of earth material of different permeability as referred to by the numerals 32, 34, 36, 38, and 40. A generally vertically extending hydraulic fracture 42 is shown formed in the earth formation zone 30 and into which slurried solid waste material has been pumped. As indicated in FIG. 2, solids material has been deposited in the upper and lower regions of the fracture 42, as indicated at numerals 44 and 46, respectively. Still further, a layer of solids material or "filtercake" has completely bridged across the opposed fracture faces 43 and 45, as indicated at 48, to leave elongated fluid-conducting passages 50 and 52. The layers of earth formation 32, 36, and 40 have been determined to be of higher permeability than the layers 34 and 38.

Accordingly, as the fracture 42 is developed and the waste slurry is pumped into the fracture space, fluid will leak off into the formation layers 32, 36, and 40 at a much higher rate than can happen in the layers 34 and 38. In this way solids material, or so-called filtercake, will deposit at 44, 46, and 48 while leaving relatively unobstructed passages 50 and 52 extending substantially the length of the fracture along the layers 34 and 38 which are of relatively lower permeability. Thanks to the location of the fracture 42 in a formation zone which includes at least one layer such as the layer 36 which is disposed between opposite ends of the fracture, the deposition of solids waste material at 48 will substantially aid in propping the fracture open during the waste disposal injection process. Accordingly, a substantial amount of slurry material may be injected into the fracture 42 to flow through the passages 50 and 52 relatively unobstructed to allow the fracture to extend its length, not shown in FIG. 2, at modest injection pressures which do not exceed the earth's in situ stresses both above and below the vertical limits of the fracture.

As the waste disposal slurry flows through the passages 50 and 52, some fluid will, of course, leak off through the deposited filtercake 44, 46, and 48, and these layers will gradually grow in thickness and height. However, the leak-off rate through this filtercake will gradually diminish as the thickness of the material increases and the area of the fluid passages 50 and 52 will remain substantial to permit the fracture to extend laterally from the well and to accommodate a greater volume of disposal slurry than is likely to be possible with a fracture wherein the permeability of the formation delimiting the fracture is substantially constant throughout the height or transverse extent of the fracture.

The determination of the total amount of pumping time which will cause the fracture pressure to increase to the maximum which can be tolerated by the stresses that are bounding the fracture to prevent fracture breakout into an unwanted zone can be calculated for the fracture configuration of FIGS. 1 and 2 by assuming that the fracture is generally vertical and confined to a low-stress zone which is bounded at top and bottom by formation layers of higher stress and the fracture is of constant height. It is assumed that the injected slurry exhibits Newtonian rheology, that the hydraulically fractured strata is porous and highly permeable, and that fluid which leaks off is readily conducted away without significantly changing the stress or fluid pressure in the formation surrounding the fracture. The leak-off rate through the filtercake can be quantified by the usual concepts of spurt loss and leak-off coefficient. It is also assumed that the filtercake is not subsequently eroded by fluid motion and that the pressure in the fracture is essentially uniform at any given distance away from the disposal well.

In the example which produced the pressure increase versus pump time in FIG. 3, it is assumed that the fracture height is 110 feet, the Young's modulus of the earth formation is 200,000 psi, Poisson's ratio is 0.15, the viscosity of the slurry is 30 centipoise, the pump rate is 1.33 BPM, the spurt loss is 10 cc/22.8 cm$^2$, the leak-off coefficient is 0.002 feet/$\sqrt{min}$., and the solids ratio in the slurry is 0.05.

Figure 4:
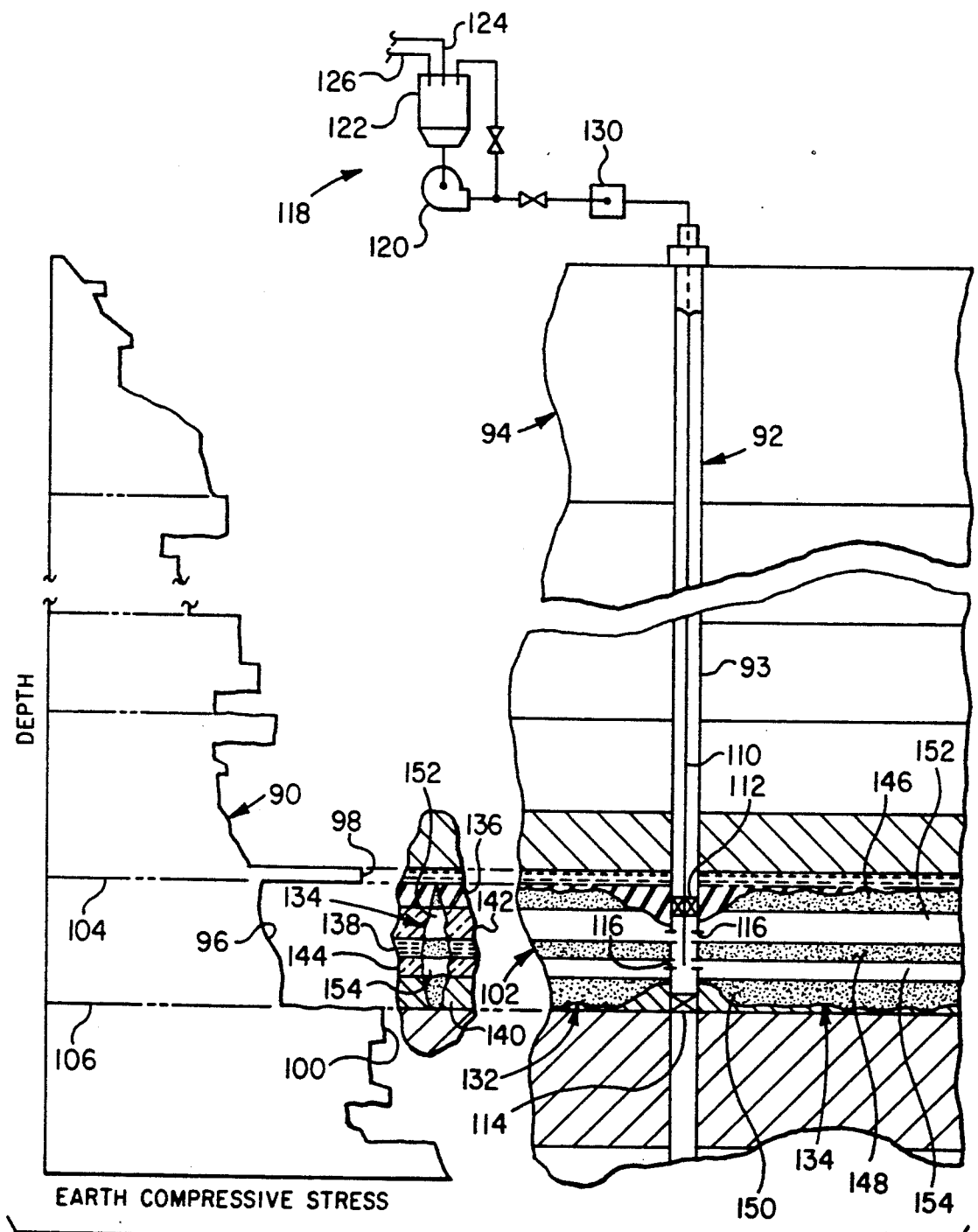
FIG. 4 is a composite view including a diagram of earth stresses versus depth and diagrams of a typical injection well and the resultant hydraulic fracture for waste disposal in accordance with the present invention.

Referring now to FIG. 4, there is shown a composite diagram including a graph of the earth compressive stress versus depth on the left side of the figure and a schematic diagram of a wellbore penetrating an earth formation and generating a fracture in a zone of interest in the earth formation which has multiple alternating layers of relatively high permeability and relatively low permeability to fluid flow. A small detail transverse section view of one of the fracture wings is shown between the depth versus stress diagram and the schematic diagram of the disposal well to better illustrate the zone of interest having the alternating layers of material which have relatively high and low permeability, respectively. The diagram to the left side of FIG. 4 shows a somewhat discontinuous "curve" 90 of the minimum in situ horizontal compressive stress versus depth for an earth formation 94. These stress values may be determined by conventional means during drilling of a well 92 into the earth formation 94. Conventional core sampling or logging techniques may be used to determine the values of compressive stress at various depths, for example.

A desired waste disposal zone is one which exhibits relatively low compressive stress such as indicated by the stress curve segment 96 in FIG. 4 and is bounded by layers of earth formation which exhibit relatively high compressive stress such as indicated b the curve segments 98 and 100. Accordingly, a fracture may be initiated in a zone of interest which is bounded by layers of earth formation which are under greater compressive stresses so that a fracture may be propagated generally laterally within the zone of interest without breaking out vertically into zones above or below the zone of interest.

The second parameter which must be determined to qualify the zone of interest for a disposal well for a solids-laden slurry in accordance with the present invention is a zone of interest such as generally indicated by the numeral 102 in FIG. 4, defined between depth lines 104 and 106 and which has multiple layers of earth material which exhibit different permeability to fluid flow. This determination of permeability for the zone 102 can be carried out using conventional coring or logging techniques also.

In FIG. 4 the well 92 which, in the zone of interest 102 may be cased or uncased, is provided with conventional injection conduit means 110 and seal means such as a packer and a bride plug interposed in the wellbore as indicated at 112 and 114 above and below the zone of interest, respectively. If the wellbore is cased, as indicated by casing 93 in FIG. 4, suitable perforations 116 are formed for conducting fluid into the formation. A suitable system 118 is provided for injecting a slurry of solids entrained in a carrier liquid into the well 92 to be carried through the conduit 110 and the perforations 116 into the zone 102. The system 118 may be similar to that described in U.S. Pat. No. 5,109,933. A simplified version of such a system is illustrated in FIG. 4 including means for reducing the particle size of the solids such as the centrifugal pump 120, a receiving tank 122 for receiving solids particles to be reduced in size and conduits 124 and 126 for conducting solids and a carrier liquid to the tank for mixing therein. A slurry of fine solids particles and carrier liquid discharged from the pump 120 may be circulated back through the tank 122 or selectively conducted to a high-pressure injection pump 130 for injection into the well 92.

In order to form a conventional two-winged generally vertically extending fracture, the pump pressure is raised to the value which will exceed the earth's compressive stress in the zone of interest 102 wherein opposed fracture wings 132 and 134 begin to radially extend from the well 92.

The detail cross-section view of the fracture wing 134, shown between the compressive stress diagram and the schematic diagram of the well 92, shows that the fracture wing which extends through layers of earth material of relatively high permeability, indicated by the numerals 136, 138, and 140, and which are interposed between layers of relatively low permeability 142 and 144. Accordingly, during injection of the slurry into the well 92 solids "filtercake" will deposit in the fracture wings 132 and 134 adjacent the zones of relatively high permeability such as indicated by numerals 146, 148, and 150 to leave flow passages 152 and 154 extending substantially away from the well 92 and through the respective fracture wings 132 and 134. The radial extent of the fracture wings 132 and 134 away from the well 92 is, of course, determined by the amount and sustainable pressure in excess of the formation breakdown pressure of waste fluid pumped into the fractures. Since the vertical height of the fractures is confined by the higher stress layers above and below the lines 104 and 106, the fractures will grow generally laterally or radially away from the well 92 unless the restriction or impediment to fluid flow causes the pressures to increase to a point wherein there is a chance that the fractures will grow vertically and break out of the zone 102. Accordingly, the fluid injection pressures are typically carefully monitored to avoid this circumstance.

The examples of fracture zones of interest which have alternate layers of relatively high permeability and relatively low permeability material together with relatively low compressive stress characteristics are exemplary. That is, there may be zones available in a particular earth formation wherein only one layer of high permeability and one layer of low permeability formation material exists which will be suitable for injection, or where there are alternate layers of high permeability, low permeability, and then high permeability in a vertical direction, thereby leaving only one flowpath. Ideally, there are at least two or three layers of low permeability bounded by layers of high permeability material as indicated in FIGS. 2 and 4. This specific arrangement is not necessary, however, to enjoy the benefits of the present invention.

Although preferred embodiments of the present invention have been described in detail herein, those skilled in the art will appreciate that various substitutions and modifications may be made to the method of disposing of solids material in hydraulically-fractured earth formations without departing from the scope and spirit of the invention as recited in the appended claims.

What is claimed is:

1. A method for disposing of solids waste material in an earth formation comprising the steps of:
    defining a formation zone of interest which has at least one layer of earth material which is relatively permeable to fluid flow and an adjacent layer of earth material which is relatively impermeable to fluid flow therethrough;
    injecting a slurry including particles of said solids waste into said zone of interest at a pressure sufficient to hydraulically fracture said zone of interest in such a way that a fracture is formed which intersects said layers of earths material; and
    continuing the injection of said slurry to deposit a filtercake of said particles in said fracture adjacent to said layer of relatively permeable material and to form a relatively unobstructed flowpath through said zone of interest adjacent to said layer of material that is relatively impermeable to fluid flow.

2. The method set forth in claim 1 wherein:
    said slurry is injected into said formation through an injection well penetrating said zone interest.

3. The method set forth in claim 1 including the step of:
    reducing the particle size of said solids waste material and providing a slurry of a carrier liquid and said particles of solids waste material which will deposit said solids waste material in said fracture as a layer of filtercake adjacent said layer of material of relatively high permeability to prop open said fracture.

4. The method set forth in claim 1 including the step of:
    pumping said slurry into said fracture until the pumping pressure increases to a value at least slightly less than the minimum in situ compressive stress of said formation adjacent said zone of interest.

5. A method for disposing of solids waste material in an earth formation comprising the steps of:
    defining a formation zone of interest which has plural layer of earth material which have different permeabilities to fluid flow;
    forming a slurry of relatively fine particles of said solids waste material and a carrier liquid;
    injecting said slurry into said zone of interest at a pressure sufficient to extend a hydraulic fracture in said zone of interest in such a way that a fracture is formed which intersects said plural layers of earth material; and
    continuing the injection of said slurry to deposit a filtercake of said particles in said fracture while forming at least one relatively unobstructed flowpath in said fracture to extend said fracture to receive said slurry.

6. A method for disposing of solids waste material in an earth formation comprising the steps of:
    defining a formation zone of interest which has plural layers of earth material which have different permeabilities to fluid flow and wherein said zone of interest has a minimum in situ compressive stress of said earth material which is bounded by further layers of earth material which have higher in situ compressive stresses so as to confine said fracture to said zone of interest;
    forming a slurry of relatively fine particles of said solids waste material and a carrier liquid; and
    injecting said slurry into said zone of interest at a pressure sufficient to extend a hydraulic fracture in said zone of interest in such a way that a fracture is formed which intersects said plural layers of earth material.

7. The method set forth in claim 6 wherein:
    said slurry is injected into said formation through an injection well penetrating said zone of interest.

8. The method set forth in claim 7 including the step of:

pumping said slurry into said fracture until the pumping pressure increases to a value at least slightly less than said minimum in situ compressive stress of said formation adjacent said zone of interest.

9. A method for disposing of solids waste material in an earth formation comprising the steps of:

defining a formation zone of interest which has at least one layer of earth material which is relatively permeable to fluid flow and an adjacent layer of earth material which is relatively impermeable to fluid flow therethrough; and injecting a slurry including particles of said solids waste and a carrier liquid into said zone of interest and into a fracture in said zone of interest to deposit a filtercake of said particles in said fracture adjacent to said layer of relatively permeable material and to form a relatively unobstructed flowpath through said zone of interest adjacent to said layer of material that is relatively impermeable to fluid flow.

10. A method for disposing of solids waste material in an earth formation comprising the steps of:

defining a formation zone of interest which has at least one layer of earth material which is relatively permeable to fluid flow and an adjacent lay of earth material which is relatively impermeable to fluid flow therethrough and wherein said zone of interest has a relatively low compressive stress of said earth material which is bounded by layers of earth material which have higher compressive stresses so as to confine said fracture to said zone of interest; and injecting a slurry including particles of said solids waste into said zone of interest at a pressure sufficient to hydraulically fracture said zone of interest in such a way that a fracture is formed which intersects said layers of earth material.

11. A method for disposing of solids waste material in an earth formation comprising the steps of;

defining a formation zone of interest which has at least one layer of earth material which is relatively permeable to fluid flow and an adjacent layer of earth material which is relatively impermeable to fluid flow therethrough and wherein said zone of interest has a relatively low compressive stress of said earth material which si bounded by layers of earth material which have higher compressive stresses so as to confine said fracture to said zone of interest;

injecting a slurry including particles of said solids waste into said zone of interest at a pressure sufficient to hydraulically fracture said zone of interest in such a way that a fracture is formed which intersects said layers of earth material; and continuing the injection of said slurry to deposit a filtercake of said particles in said fracture adjacent to said layer of relatively permeable material and to form a relatively unobstructed flowpath through said zone of interest adjacent to said layer of material that is relatively impermeable to fluid flow.

12. A method for disposing of solids waste material in an earth formation comprising the steps of:

defining a formation zone of interest which has at least one layer of earth material which is relatively permeable to fluid flow and an adjacent layer of earth material which is relatively impermeable to fluid flow therethrough and wherein said zone of interest has a relatively low in situ compressive stress of said earth material which is bounded by layers of earth material which have higher in situ compressive stresses so as to confine said fracture to said zone of interest; and injecting a slurry including particles of said solids waste and a carrier liquid into said zone of interest and into a fracture in said zone of interest to deposit a filtercake of said particles in said fracture adjacent to said layer of relatively permeable material and to form a relatively unobstructed flowpath through said zone of interest adjacent to said layer of material that is relatively impermeable to fluid flow.

13. A method for disposing of solids waste material in an earth formation comprising the steps of:

fracturing said earth formation in a zone of interest which has at least one layer of earth material which is relatively permeable to fluid flow and at least one layer of earth material which is relatively impermeable to fluid flow therethrough in such a way that a fracture is formed which intersects said layers of earth material; and injecting a slurry including particles of said solids waste into said fracture to deposit a filtercake of said particles in said fracture adjacent to said layer of earth material which is relatively permeable to fluid flow and to form a relatively unobstructed flowpath through said zone of interest adjacent to said layer of earth material which is relatively impermeable to fluid flow.

* * * * *